Dec. 24, 1935.   H. E. WARREN   2,025,560
ALTERNATING CURRENT MOTOR
Filed March 16, 1934   4 Sheets-Sheet 1
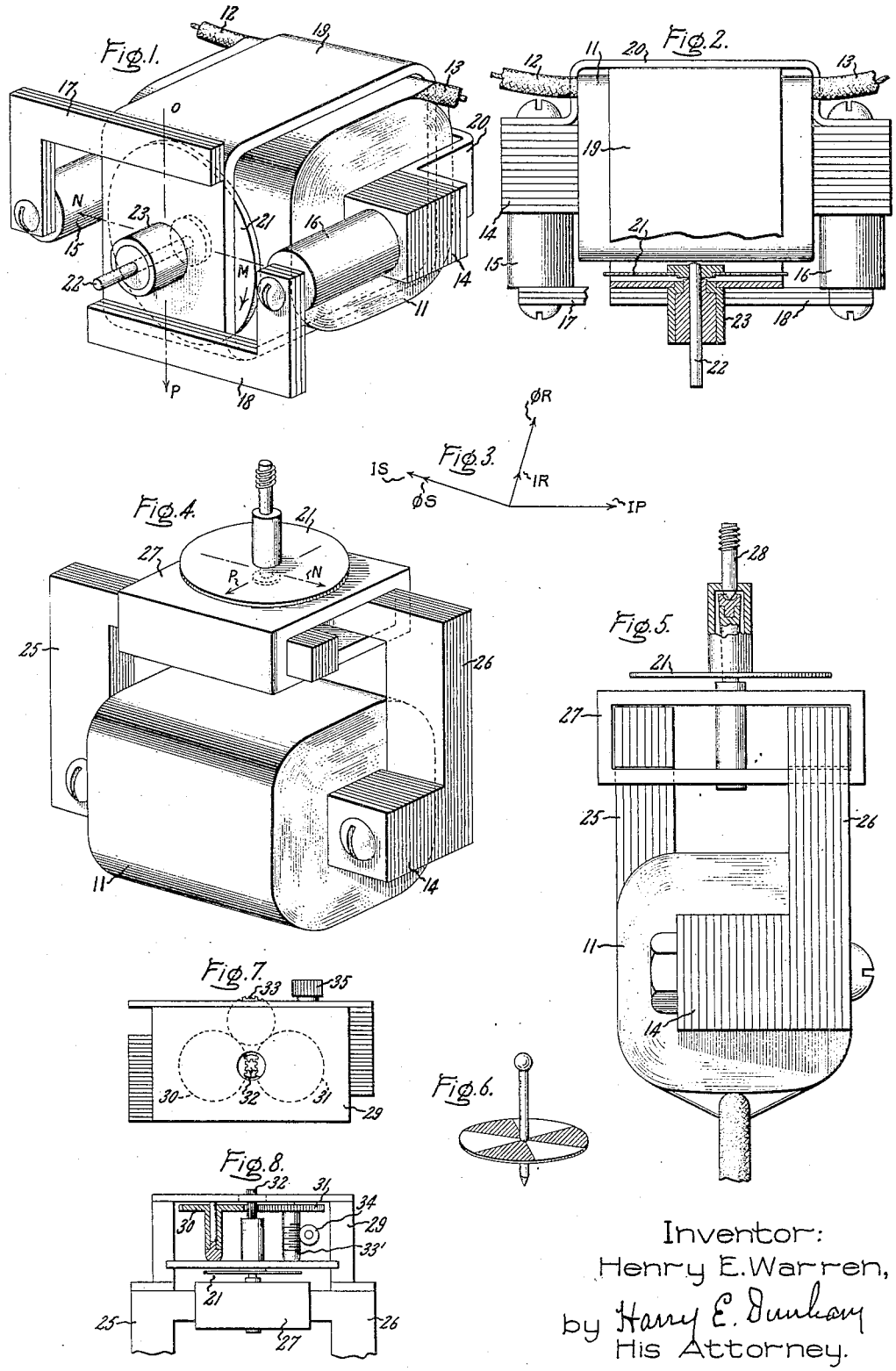
Inventor:
Henry E. Warren,
by Harry E. Dunham
His Attorney.

Dec. 24, 1935.   H. E. WARREN   2,025,560
ALTERNATING CURRENT MOTOR
Filed March 16, 1934    4 Sheets-Sheet 2
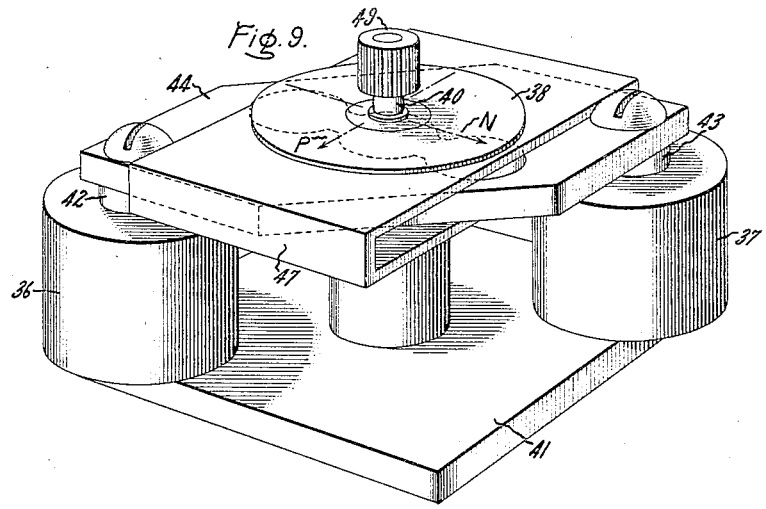
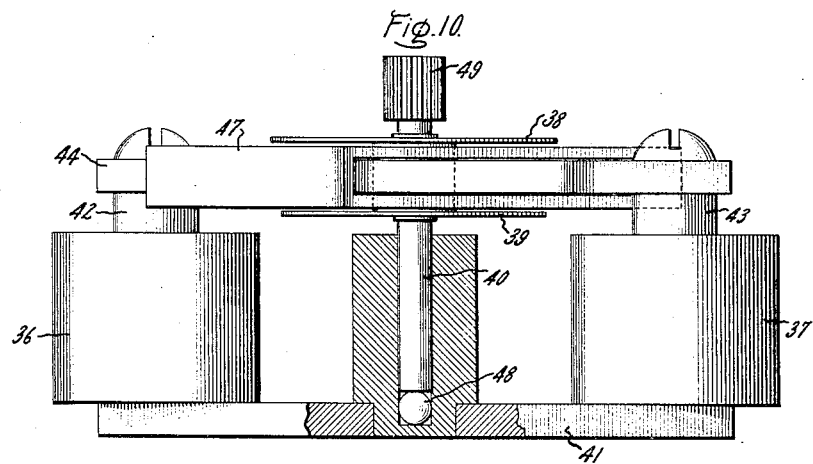
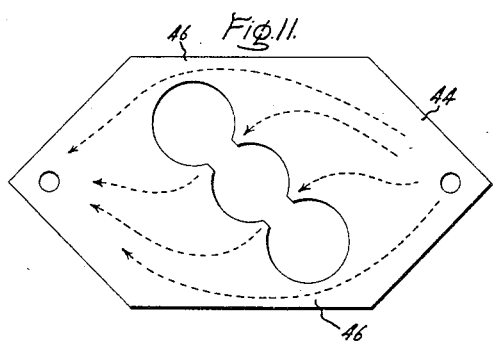
Inventor:
Henry E. Warren,
by Harry E. Dunham
His Attorney.

Dec. 24, 1935. H. E. WARREN 2,025,560
ALTERNATING CURRENT MOTOR
Filed March 16, 1934 4 Sheets-Sheet 3

Inventor:
Henry E Warren,
by Harry E. Dunham
His Attorney.

Dec. 24, 1935.  H. E. WARREN  2,025,560
ALTERNATING CURRENT MOTOR
Filed March 16, 1934  4 Sheets-Sheet 4

Inventor:
Henry E. Warren,
by Harry E. Dunham
His Attorney.

Patented Dec. 24, 1935

2,025,560

UNITED STATES PATENT OFFICE 2,025,560

ALTERNATING CURRENT MOTOR

Henry E. Warren, Ashland, Mass., assignor to Warren Telechron Company, Ashland, Mass., a corporation of Maine Application March 16, 1934, Serial No. 715,809

21 Claims. (Cl. 172—275)

My invention relates to single-phase alternating current motors in which transformer action is employed to create useful torque fluxes displaced in time phase with respect to each other. Although not limited thereto, the invention is particularly adapted for the construction of synchronous hysteresis motors where the rotor is of the disc type, and the invention will be explained as applied to small motors of this type suitable for driving timing devices.

In carrying my invention into effect, I employ a primary member having a magnetic circuit carrying a single-phase primary winding and a low-resistance short-circuited secondary winding, preferably of a single turn, the magnetic circuit being provided with an air gap across which the flux in the resulting transformer core passes. This flux may be called the primary flux. The single-turn secondary winding is so disposed adjacent this air gap as to set up a second flux at substantially right angles to the first mentioned flux and displaced in quadrature time-phase relation with respect thereto. This flux may be called the secondary flux.

A rotor, preferably of the hysteresis disc type, is rotatively mounted in torque-producing relation within the influence of these alternating flux pulsations. Such a motor is inexpensive and rugged in construction and possesses a starting and synchronizing torque appreciably greater than can be obtained in the ordinary shaded pole motor of comparative size due primarily to an improvement in the phase and angular displacement and balance of the torque-producing fluxes.

Figure 12:
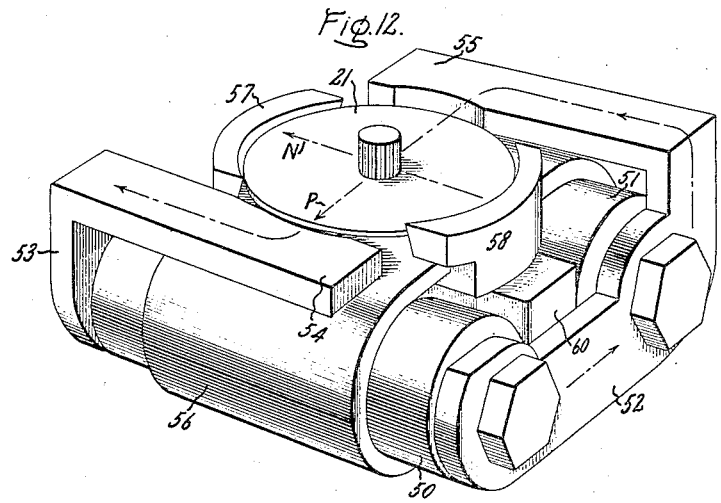
Figure 13:
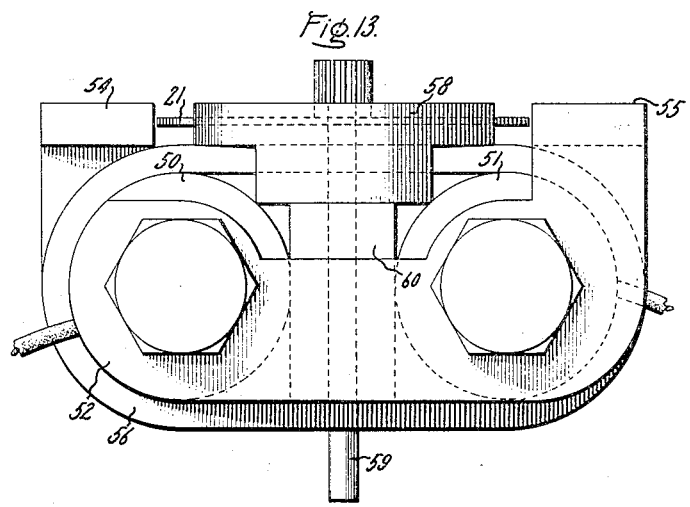
Figure 14:
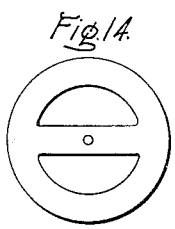
Figure 15:
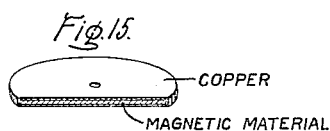
Figure 16:
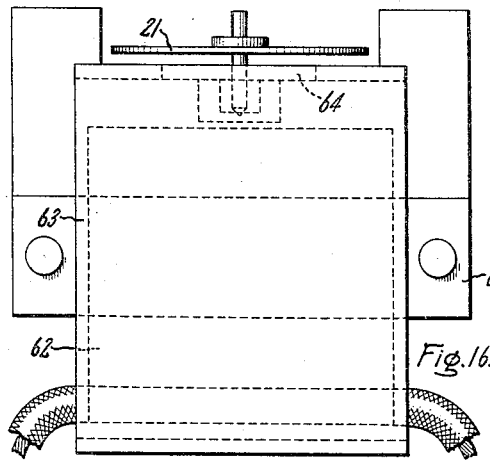
Figure 19:
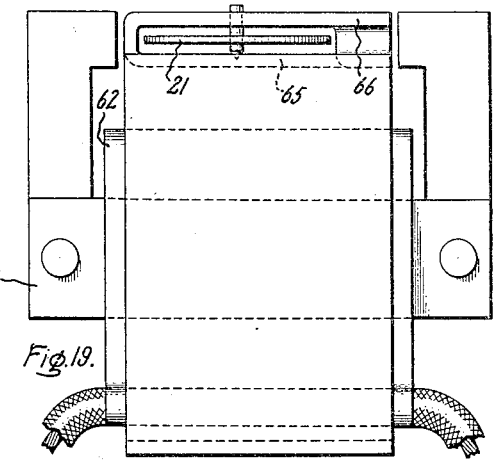
Figure 17:
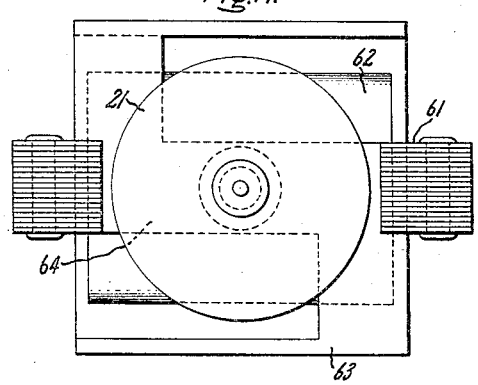
Figure 20:
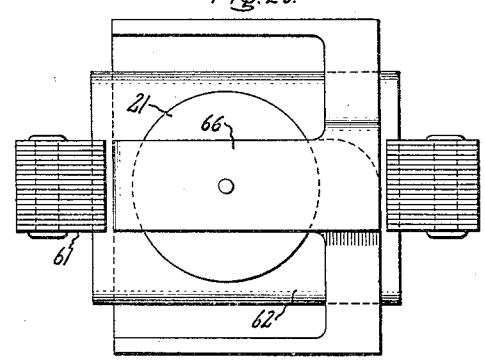
Figure 18:
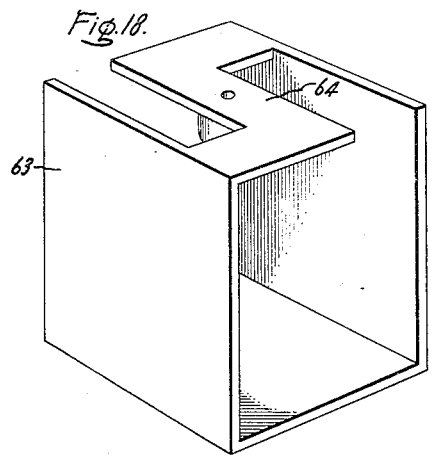
Figure 21:
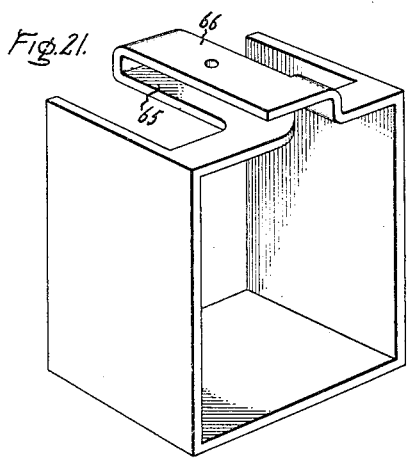

The features of my invention which are believed to be novel and patentable will be pointed out in the claims appended hereto. For a better understanding of my invention, reference is made in the following description to the accompanying drawings wherein several different modifications of the invention are illustrated. Figs. 1 and 2 show perspective and top views, the latter partially in section, of a simple form of my invention where the rotor is mounted within the secondary winding; Fig. 3 is a vector diagram explanatory of the flux relations in this type of motor; Figs. 4 and 5 are perspective and end views, respectively, of a form of motor embodying the invention where the rotor is outside the secondary winding and is freely accessible; this accessibility of the rotor is further illustrated in Fig. 6 where the rotor is represented as a top which may be spun by bringing it into torque-producing position adjacent the motor field and then removed while spinning; Figs. 7 and 8 show elevation and end views, the latter partly in section, of a speed reducing gear arrangement that may be advantageously used with a rotor such as is shown in Fig. 4; Fig. 9 shows a top perspective view of a double rotor motor employing my invention where the primary winding is divided into two sections; Fig. 10 is a side view, partly in section, of the motor shown in Fig. 9 as viewed from the near corner of Fig. 9; Fig. 11 is a plan of the upper magnetic plate of the motor shown in Figs. 9 and 10; Figs. 12 and 13 are perspective and end views, respectively, of another modification of my invention where the secondary is provided with pole pieces which are shaped to eliminate end thrust in the rotor; Figs. 14 and 15 represent different forms of disc rotors that may be used in any of the modifications. Figs. 16, 17 show side and top views respectively of a form of the invention where the single turn secondary winding of the transformer motor is so shaped as to have the current therein flow substantially parallel to its axis in the vicinity of the disc armature; Fig. 18 represents a perspective view of such transformer secondary as it would appear removed from the motor of Fig. 17; Figs. 19 and 20 show side and top views respectively of a motor very similar to that of Figs. 16 and 17 except that the transformer secondary is doubled back and around the disc rotor of the motor, thereby increasing the torque fluxes produced by the secondary; and Fig. 21 represents this form of secondary as it would appear removed from the motor.

Referring now particularly to Figs. 1, 2, and 3 for a more detailed description, it will be noted that the motor is provided with a primary winding 11 of simple coil construction having terminals 12 and 13 for connection to a single-phase source of supply. This coil surrounds a magnetic core 14 having laterally extending magnetic parts 15 and 16 to which are secured L-shaped magnetic pole piece members 17 and 18 which are separated by an air gap. Also embracing the core 14 is a short-circuited secondary 19 composed of a single band of copper. This secondary surrounds the primary winding and, as indicated, is of such dimensions as to be of very low resistance. One side of this rectangular-shaped secondary lies closely adjacent to and parallel with the plane of the pole pieces 17 and 18. The secondary is rigidly secured to the field laminations by a non-magnetic strap 20.

In Fig. 3, we may represent the ampere turn current in the primary coil 11 at a given instant by the vector IP and that of the secondary by the vector IS. These vectors are nearly 180 degrees time phase apart due to the transformer action since it is evident that the motor stator is a transformer. The resultant current which produces flux in the core 14 may be represented by the vector IR and the resulting primary flux by the vector ØR. This is the flux which crosses the air gap between the pole pieces 17 and 18 along the line represented by OP, Fig. 1. The heavy current in the low-resistance secondary produces a flux represented by the vector ØS, Fig. 3, substantially in quadrature time phase relation to the flux ØR. A large part of the secondary flux treads only the secondary along a line MN at right angles to the line OP, Fig. 1, and closely adjacent thereto, particularly because, at this point, I have placed the magnetic disc rotor 21 which provides a magnetic path in line with this secondary flux. This rotor may be secured to a shaft 22 and mounted in a suitable bearing 23 secured in the adjacent side of the secondary 19 as best shown in Fig. 2.

Due to the close proximity of this magnetic disc rotor to the air gap between poles 17 and 18, it is magnetically in this air gap and a substantial portion of the primary flux between these pole pieces passes diametrically through the rotor disc in the direction OP, Fig. 1, and, substantially 90 degrees time phase thereafter, the secondary flux in the same vicinity crosses the same disc rotor along the line MN at substantially right angles to the line OP. Thus, there is created in the rotor disc the same kind of a rotating magnetic field that is created in an ordinary two-phase, quarter-phase motor and, by suitably proportioning the parts, these quarter-phase fluxes passing through different diameters of the disc may be made approximately equal.

If the rotor be made of hardened steel, the fluxes will create a satisfactory hysteresis starting and accelerating torque. Thus, the primary flux along the line OP will tend to permanently magnetize the disc in this direction, and the secondary flux along the line MN will tend to permanently magnetize the disc in the latter direction. However, the magnetic poles set up in the disc by the primary flux will try to turn so as to align with the secondary magnetic flux occurring ninety degrees time phase later. During the first few revolutions, the magnetic poles in the disc will slip more or less, creating hysteresis starting and accelerating torque but very quickly the magnetic poles in the disc will cease to slip and align with the quadrature alternating flux pulsations in a synchronous relation, producing in the motor represented one revolution for each complete flux cycle or 3600 revolutions per minute when the motor is energized with 60 cycle energy.

It will be apparent that the direction of rotation of the motor may be readily changed by reversing the vertical positions of the pole pieces 17 and 18. Thus, remove the screw holding pole piece 17 and turn the L-shaped pole piece over and fasten in place with the long arm at the bottom instead of at the top, and similarly reassemble pole piece 18 with the long arm at the top. This will reverse the direction of the primary flux through the rotor for the same direction of secondary flux therethrough, and the resulting torque and direction of rotation of the rotor will be reversed.

In the foregoing, it has been assumed that the primary and secondary fluxes through the rotor are equal in magnitude, ninety degrees apart in time phase relation, and cross the rotor axis at right angles to each other. These are the ideal conditions and they can be closely approximated by proper design. However, I wish it to be understood that these ideal conditions are not essential to the building of a successful motor and I do not wish to limit my invention to a motor in which these ideal conditions exist. It may be stated, however, that the principle used is one that lends itself to the obtaining of a much more nearly perfect rotating magnetic field in a single-phase motor than those used in previous single-phase motors of comparative simplicity and cost.

The same principle is used in modified form in the construction shown in Figs. 4 and 5. Here, 11 represents the primary coil, 14 the core, and 25 and 26 the magnetic extensions which extend around the primary coil toward each other to form a flux gap in much the same manner as in Fig. 1. The secondary 27, consisting of a low resistance band of copper or other good conducting material, does not surround the primary coil as in Fig. 1 but embraces the primary magnetic circuit at the air gap therein. The magnetic disc rotor 21 is placed just outside the secondary 25 where it will intercept and convey flux set up by the secondary across a diameter of the rotor. This disc is close enough to the air gap between the pole pieces of the primary magnetic circuit to intercept and convey a substantial portion of the primary flux between these pole pieces along a diameter of the disc which is at right angles to the direction of the secondary flux therethrough. The primary flux direction through the disc may be represented by the arrow P, and the secondary flux which occurs approximately a quarter of a cycle later has its direction represented by arrow N, in Fig. 4. It may be noted that, in Fig. 1, the disc intercepts the secondary flux inside the secondary whereas, in Fig. 4, the disc intercepts secondary return flux outside the secondary. The direction of rotation will be counterclockwise as viewed in Fig. 4, and the motor may be made to operate in the opposite direction by assembling the pole pieces 25 and 26 on the opposite sides of the core 14 from the positions shown.

In this modification, the pole pieces may hold the secondary band 27 firmly in place by a slight resilient tendency to spread apart laterally. The bearing support shown is secured to the secondary band 27 and, after assembly, the secondary band 27 with the rotor assembly may be adjusted parallel to the pole pieces to a limited extent by forcing the band in an axial direction without interfering with successful operation.

The particular form of bearing shown in Fig. 5 supports the disc armature on a pivot bearing like that used in supporting compass needles so as to have a minimum of friction and a long life without lubrication. A worm shaft 28 is provided for taking power from the motor.

In this form of the invention, the armature is freely accessible and can be easily removed and replaced and may be used for many purposes. As an example, the rotor may be made in the form of a top, as represented in Fig. 6, having suitably colored designs painted on its upper surface and provided with a pivot bearing extending below the disc. Such a top may be spun by merely placing the armature in place in the motor field. The armature assembly may then be lifted off while spinning and be transferred to some other surface until a further spinning action is desired.

Where any appreciable amount of power at low speed is to be taken from the form of motor shown in Figs. 3 and 4, a combined upper bearing and gear reduction unit such as is shown in Figs. 7 and 8 may be used to advantage. This consists of a gear reduction supported in a frame 29 mounted on the pole pieces 25 and 26 as shown in Figs. 7 and 8. A pair of similar gears 30 and 31 on opposite sides of the motor shaft mesh with a pinion 32 secured to such shaft. These gears 30 and 31 are also geared together through an idler gear 33. The gears 30, 31, and 33 all have suitable bearings in the frame 29. As a result, the upper end of the motor shaft cannot move laterally in any direction although it has no upper bearing except that incident to meshing with gears 30 and 31. No upper bearing is, therefore, necessary for this high speed rotor shaft as it is held in place by the same gears used to reduce its speed. The efficiency of this kind of drive is exceptionally high because friction is minimized and practically all the power of the rotor is divided equally between the two gears 30 and 31. The gears are, preferably, of the spiral form for quietness in operation. If a further speed reduction is required, gear 31 may have a worm 33' on its shaft meshing with a worm pinion 34 mounted on the same shaft with an external driving pinion 35.

Figs. 9, 10, and 11 relate to a further modification of my invention in which the motor has two rotors and the primary winding is divided into two sections. However, it should be noted that the presence of a double rotor does not require the presence of a two-section field winding. The division of the primary winding into two sections represented at 36 and 37 makes the motor more compact in the form shown, whereas the double disc rotor assembly, the rotors being shown at 38 and 39 on the same shaft 40, is primarily for the purpose of increasing the efficiency and eliminating end thrust.

The cores 42 and 43 of the two primary field sections are bolted at the bottom to the opposite corners of a rectangular magnetic plate 41 which serves also as a base for the motor. The upper ends of these cores are bolted to the opposite ends of an oblong magnetic plate 44, the shape of which is best shown in Fig. 11. The upper plate has an opening across its center in a diagonal direction, leaving thin supporting sections 46 at the edges between the pole pieces. The flux produced in the magnetic circuit by the primary winding has a tendency to cross the upper magnetic plate 44 in some such fashion as is represented by the arrows on Fig. 11, a small portion going through and saturating the reduced portions 46 at the edges and the remainder creating a difference of magnetic potential in the pole pieces which are separated by the air gap in the plate.

The upper plate 44 also supports the secondary 47 which consists of a flattened, closed band of copper surrounding the plate 44 with its axis parallel to and symmetrical with the air gap cut in plate 44. It will be observed that the plate 44 serves as a core for the flux of the secondary and that the primary and secondary fluxes therethrough are at right angles to each other. The steel disc rotors 38 and 39 are mounted parallel to plate 44 and secondary 47, are in close proximity to the outer sides of the secondary and symmetrical with respect to the air gap in plate 44 and the axis of the secondary. The rotor shaft 40 is supported by a step bearing 48 in the base plate 41 and an upper guide bearing secured at the center of the secondary 47 and carries a driving pinion 49 at its upper end.

The difference in magnetic potential created on opposite sides of the air gap in plate 44 by the primary flux causes a portion of such flux to take parallel paths through the steel disc rotors in passing from one side to the opposite side of such air gap, as indicated by the arrow P for the upper disc. The secondary flux returning outside the secondary is also intercepted by the rotor discs as represented by the arrow N for the upper disc. The division of these fluxes between the upper and lower steel disc armatures 28 and 29 will be determined by the spacing of the discs from the plate 44 and the diameters and thicknesses of the discs. If the disc fluxes are unequal, there will be a resultant magnetic end thrust but, by using proper spacing and dimensions, this end thrust can be adjusted as desired or entirely eliminated, that is, the downward magnetic pull on the top disc can be balanced against the upward magnetic pull on the lower disc, or against the latter plus the weight of the rotating parts. In the drawings, I have represented the air gap relations equal, the thicknesses of the discs equal, and the upper disc slightly larger in diameter to the extent necessary to produce a slight resulting downward magnetic thrust which firmly seats the vertical shaft and eliminates noise due to endwise movement of this shaft, and also prevents the shaft from rising to a point where the upward magnetic pull would predominate and lift the shaft.

The primary and secondary flux components in the upper and lower discs produce rotation in the same direction and the torques add. The fluxes are efficiently utilized, resulting in a compact, powerful motor. In this modification, it will be observed that the primary flux which is shunted from the discs through the narrow portions 46 of the upper plate nevertheless pass through the secondary and result in the production of secondary current and secondary flux. The relative values of the primary and secondary fluxes which cross the rotor discs may be very nicely balanced by properly dimensioning the restricted portions 46 of the upper plate 44. Thus, if these sections 46 are made thicker so as to pass more primary flux, the primary fluxes through the discs are decreased in proportion to the secondary fluxes therethrough. It will be apparent that the double rotor arrangement of Fig. 9 can be applied readily to the forms of the invention shown in Figs. 4 and 12. In Fig. 4, using a single rotor, the magnetic end thrust may be partially offset by using a worm gear drive pitched to produce a lifting tendency on the shaft in driving a load.

In the form of the invention shown in Figs. 12 and 13, I have illustrated another way of eliminating rotor end thrust which does not require the use of two magnetic disc rotors. In this modification, the primary winding is divided into two sections 50 and 51, wound about parallel core pieces which are concealed by the windings. Winding sections 50 and 51 are connected to produce similar poles at the adjacent ends of their core pieces at any given instant, and the adjacent ends are connected together by magnetic yokes or pole piece members 52 and 53. These pole pieces have angular extensions 54 and 55 separated by an air gap in which the steel disc rotor 21 is symmetrically mounted. The primary flux, therefore, takes a path through the rotor as indicated by the line P, Fig. 12.

Surrounding both primary cores and coils is the low resistance secondary comprising the heavy copper band 56. The secondary has a current induced therein by the primary flux and, in turn, produces a secondary flux in quadrature time phase relation with respect to the primary flux. This secondary flux is directed by a secondary core piece, with its pole pieces 57 and 58, through the rotor disc at right angles to the primary flux therethrough as indicated by the line N, producing rotation in a clockwise direction as viewed in Fig. 12. It will be perceived that the primary flux does not tend to produce end thrust on the rotor, however, the secondary flux would ordinarily tend to shorten its path and thus pull the disc downward. To offset this tendency, I have given the secondary pole pieces 57 and 58 a conical shape at the surfaces adjacent the rotor, making the air gap wedge shaped and narrower at the top edges and wider at the bottom edges, which produces a tendency for the secondary flux to lift the rotor to the position of minimum air gap. In this way, the magnetic end thrust on the rotor may be minimized or eliminated. The rotor is mounted on a shaft 59 and supported in suitable bearings, the shaft passing through central openings in the secondary band 56 and its core piece. A suitable non-magnetic supporting block 60, to which the secondary core piece may be secured or by which it may be simply wedged in place, is clamped between the yokes 52 and 53, and this block may also contain the motor bearings. This motor has few parts which are easily assembled in a rugged compact motor construction. This motor may be adapted for the opposite direction of rotation by providing another set of yokes with polar extensions reversed to take the place of yokes 52 and 53, likewise a driving pinion may be provided on either end of the shaft.

I have indicated the rotor in all of the modifications as consisting of a plain hardened steel disc. This has been found to be satisfactory for obtaining ample starting and synchronizing torque for most purposes for which a small timing motor would be used. I may, however, make the steel disc rotor in the form shown in Fig. 14 where a polar spider bar across the middle gives the rotor more distinct polar effects and a somewhat greater synchronous pull-out torque. If only induction motor characteristics are desired, a soft iron disc covered with copper or aluminum may be used as represented in Fig. 15. If the inner disc is made of hardened steel, hysteresis starting and synchronizing torque will also be included. Where a double disc rotor motor is selected, a combination of two different kinds of rotors may be used. From these illustrations, it will be evident that the characteristics of the motor may be altered as desired while still retaining the simple, rugged construction and desirable rotating field characteristics herebefore described.

In the forms of the invention represented in Figs. 16 to 21 inclusive the motor parts, with the exception of the secondary winding, are substantially identical and Figs. 18 and 21 show the differences in the two forms of secondary windings used.

In this form of motor the core 61 is substantially of U shape with the primary coil 62 wound on the central leg forcing a flux across the air gap between the extremities of the outer legs. The disc rotor 21 of the motor is inserted in this air gap and suitably mounted for rotation therein on an axis at right angles to the path of the primary flux therethrough. The secondary comprises a closed band of copper surrounding the primary coil and differs only in the portion which lies adjacent the rotor as best shown in Figs. 18 and 19. In the motor of Figs. 16 and 17 the secondary 63 has portions of its upper part cut away to leave a central bar portion 64 lying just below the disc armature parallel to the primary flux through the armature. The secondary current flowing through portion 64 will therefore be in a direction which is substantially parallel to the primary flux through the disc armature, and will produce a secondary flux through the disc at approximately 90 degrees displaced from the primary flux both in direction and in time phase relation, thereby creating the torque relations hereinbefore described.

In the motor of Figs. 19 and 20 the secondary winding has central portions 65 and 66 both above and below the disc for creating secondary fluxes through the disc at right angles to the primary flux therethrough, the secondary being doubled back and around the disc so that the fluxes produced thereby are in the same direction through the disc at any instant.

The types of motors of Figs. 16 to 21 operate on the same principle as the motors previously described and are simple and compact in their construction and have very satisfactory torque characteristics. Where the heavy secondary band surrounds the primary winding, as in many of these motors, it affords a protecting shield for the primary winding that is advantageous if the motor is likely to receive rough handling in use.

In accordance with the provisions of the patent statutes, I have described the principle of operation of my invention together with the apparatus which I now consider to represent some of the best embodiments thereof, but I desire to have it understood that the apparatus shown is only illustrative and that the invention can be carried out by other means.

What I claim as new and desire to secure by Letters Patent of the United States is:

1. A single-phase alternating current motor comprising a magnetic circuit containing an air gap, a rotor magnetically in said air gap, a single primary winding for producing a primary flux through said rotor, and a single-turn, low-resistance, short-circuited winding threaded by all of the primary flux of said magnetic circuit for producing a secondary flux through said rotor which is substantially in quadrature time-phase relation with respect to the primary flux therethrough and displaced by a torque-producing angle to the primary flux in the rotor.

2. A single-phase alternating current motor comprising a stator having a magnetic circuit provided with an air gap, a primary winding for producing a flux in said magnetic circuit, a single-turn, low-resistance, short-circuited secondary winding embracing said magnetic circuit for producing a secondary flux in the vicinity of said air gap which secondary flux is substantially in quadrature time-phase relation with respect to and in a direction at substantially right angles to the direction of the primary magnetic flux crossing said air gap, and a rotor containing magnetic material intercepting said fluxes in torque-producing relation.

3. A single-phase alternating current motor having a stator member consisting of a transformer having a magnetic circuit containing an air gap and embraced by a primary winding and a single-turn, low-resistance, short-circuited secondary winding, said windings producing fluxes in the vicinity of said air gap which are substantially 90 degrees displaced from each other both in time-phase relation and in direction, and a rotor containing magnetic material positioned to intercept said fluxes at right angles to its axis of rotation.

4. A single-phase alternating current motor having a stator consisting of a transformer and having a magnetic circuit provided with an air gap and embraced by a primary winding and a low-resistance secondary winding consisting of a closed band of conducting material, said secondary winding being positioned to produce a secondary flux in the vicinity of said air gap which is at substantially right angles to the flux of the transformer magnetic circuit across said air gap and a rotor containing magnetic material intercepting said fluxes in torque-producing relation.

5. A single-phase alternating current motor having a stator which consists of a transformer including a magnetic circuit provided with an air gap and embraced by a primary winding, and a low-resistance, short-circuited, secondary winding, said windings producing two sets of alternating flux pulsations in the vicinity of said air gap which two sets of pulsations are displaced both in time phase and in direction at substantial angles from each other, and a magnetic disc rotor intercepting substantially equal portions of said two sets of flux pulsations at approximately right angles to its axis of rotation.

6. A single-phase alternating current motor having a stator which consists of a transformer having a magnetic circuit including an air gap and embraced by a primary winding and a low-resistance, short-circuited, secondary winding, said windings producing two sets of alternating flux pulsations in the vicinity of said air gap which pulsations are displaced both in time phase and in direction substantially 90 degrees from each other, and a rotor containing magnetic intercepting approximately equal portions of said flux pulsations in torque-producing relation.

7. A single-phase, self-starting, synchronous motor consisting of a hardened steel disc rotor together with means for producing a rotating magnetic field therein, said means comprising a transformer stator having a magnetic circuit provided with an air gap in which said rotor is magnetically located, a primary winding and a low-resistance, short-circuited, secondary winding embracing said magnetic circuit, said secondary winding being positioned to produce a secondary flux through said rotor in a direction at approximately right angles to the direction of the primary flux therethrough.

8. A single-phase, self-starting, synchronous hysteresis motor comprising stator and rotor members, the stator consisting of a magnetic circuit including an air gap in which said rotor is magnetically located, a single-phase primary winding and a single-turn, low resistance, short-circuited, secondary winding embracing said magnetic circuit in transformer relation, said rotor consisting of a disc of hardened steel intercepting the flux of the primary magnetic circuit across a diameter thereof and located within the path of the flux set up by said secondary winding to intercept the same across a diameter of the disc in a direction at approximately right angles to the direction of the primary flux in the disc.

9. A single-phase alternating current motor comprising a stator member having a magnetic circuit provided with pole pieces separated by an air gap, a primary winding and a low-resistance secondary winding embracing said magnetic circuit, a magnetic disc rotor intercepting flux crossing said air gap across a diameter of the disc, said secondary winding comprising a closed band of conducting material having a flat side portion lying closely adjacent to and parallel with said disc and producing a secondary flux across a diameter thereof substantially at right angles to the first mentioned flux therethrough.

10. A single-phase alternating current motor comprising a stator member having a magnetic circuit provided with pole pieces separated by an air gap, a primary winding and a low-resistance, single-turn, short-circuited, secondary winding embracing said magnetic circuit, a magnetic disc rotor for the motor located in the vicinity of said air gap such that flux between the pole pieces passes through the disc in a diametrical direction, said secondary winding having a flat side wall portion lying parallel to said disc between it and the aforesaid pole pieces, and producing a secondary flux diametrically through the disc substantially at right angles to the first mentioned flux.

11. A single-phase alternating current motor comprising a stator consisting of a magnetic circuit having pole pieces separated by an air gap, a primary winding and a low-resistance secondary winding embracing said magnetic circuit at other than the air gap portion thereof, a magnetic disc rotor magnetically in the air gap and intercepting flux passing between the pole pieces across a diameter of the disc, said secondary winding consisting of a closed band of conducting material having a flat wall portion lying closely adjacent and parallel to the disc rotor and producing a secondary flux therein substantially at right angles to the first mentioned flux therethrough.

12. A single-phase motor consisting of a stator member having a magnetic circuit provided with pole pieces separated by an air gap, a primary winding, and a low-resistance, single-turn, short-circuited, secondary winding embracing said magnetic circuit, and a magnetic disc rotor intercepting flux between said pole pieces across one diameter of the disc, said secondary winding having a flat inner side wall lying closely adjacent to and parallel to the disc and producing a secondary flux across another diameter of said disc approximately 90 degrees displaced from the first mentioned diameter.

13. A single-phase alternating current motor comprising a stator consisting of a magnetic circuit having pole pieces separated by an air gap, a primary winding embracing said magnetic circuit at other than the air gap portion thereof and a low-resistance, short-circuited, secondary winding embracing said magnetic circuit about the pole pieces, and a magnetic disc rotor positioned to intercept the primary flux crossing said air gap and the secondary flux set up by the secondary winding across diameters of the disc which are approximately at right angles to each other.

14. A single-phase motor consisting of a stator member having a magnetic circuit provided with pole pieces separated by an air gap, a primary winding and a low-resistance, single-turn, short-circuited secondary winding embracing said magnetic circuit, and a magnetic disc rotor intercepting flux between said pole pieces across a diameter of the disc, said secondary winding having a flat outer side wall lying closely adjacent to and parallel with said disc and producing a secondary flux across a diameter of said disc which is substantially at right angles to the first mentioned diameter.

15. A single-phase motor comprising a pair of magnetic disc rotor members mounted on a common shaft, a stator member having a magnetic circuit in which said pair of disc rotors are included in parallel relation, a primary winding for producing a primary alternating flux through said magnetic circuit, and a low-resistance secondary winding consisting of a closed band of conducting material embracing said magnetic circuit and having opposite flat side walls lying closely adjacent to and parallel with said pair of rotor discs for producing secondary fluxes therein in additive torque-producing relation with respect to the primary fluxes in said pair of discs.

16. A single-phase motor comprising a pair of magnetic disc rotors secured to the same shaft, a stator having a magnetic circuit in which said pair of discs are included in parallel relation, a primary winding for producing a primary flux through said magnetic circuit, a low-resistance secondary winding consisting of a closed band of conducting material embracing said magnetic circuit and having flat outer side walls lying closely adjacent and parallel to the said pair of rotor discs for producing secondary fluxes therein which are substantially in quadrature time-phase relation with respect to the primary fluxes in said discs, the quadrature fluxes in the two discs producing torques in the same direction of rotation and endwise magnetic forces thereon which are opposed.

17. A single-phase motor comprising a stator member having a magnetic circuit consisting of upper and lower parallel magnetic plates separated by spaced apart core pieces, a primary winding on said core pieces for producing an alternating flux through said magnetic circuit, the upper plate having a diagonal opening extending nearly across the same thereby forming magnetic pole pieces separated by an air gap in said magnetic circuit and the lower plate forming a base for the motor, a flattened band of conducting material closely surrounding the air gap portion of the upper plate and forming a transformer secondary winding on said magnetic circuit having its flux axis parallel and symmetrical to the diagonal opening in said upper plate, a vertical shaft extending through the central portions of said upper plate and secondary winding, and a pair of magnetic disc rotors secured to said shaft closely adjacent the upper and lower outside walls of said flattened band and substantially equally distant from and sufficiently close to the upper plate to intercept approximately equal and substantial portions of the primary and secondary fluxes in additive producing relation.

18. A single-phase alternating current motor comprising a primary member having a magnetic circuit including pole pieces separated by an air gap, a primary winding for producing a primary alternating flux in said magnetic circuit and crossing the air gap, a short-circuited, low-resistance, secondary winding embracing said magnetic circuit, a magnetic circuit for said secondary winding including pole pieces separated by an air gap across which a secondary flux is produced, and a magnetic disc rotor magnetically included in both of said air gaps and intercepting the primary and secondary fluxes across diameters of said disc which are substantially 90 degrees displaced.

19. In an electric motor, a flux-producing magnetic circuit including pole pieces separated by an air gap, a magnetic disc rotor included in said air gap which intercepts the fluxes from the pole pieces across a diameter of the disc, the adjacent edges of the disc and pole pieces being shaped to provide wedge-shaped air gaps between the pole pieces and disc such that the air gap dimensions vary in a direction parallel to the axis of rotation of the disc for the purpose of modifying endwise magnetic forces acting on the disc.

20. In an electric motor, a magnetic disc rotor, pole pieces adjacent the edges of the disc for directing fluxes through the disc in a plane at right angles to its axis of rotation, the faces of said pole pieces adjacent the disc being of conical shape such that the air gap dimensions between the pole pieces and disc vary in a direction parallel to the axis of rotation of the disc for the purpose of modifying endwise forces acting on the disc.

21. A single-phase alternating current motor comprising a stator provided with a pair of parallel, primary, magnetic core pieces, each provided with primary, exciting coil sections producing similar magnetic polarities at adjacent ends of the core pieces, a flattened band of conducting material surrounding both primary core pieces and their coil sections and forming a short-circuited secondary of low resistance, a pair of magnetic yokes joining adjacent ends of said core pieces together and having angular pole piece extensions which are spaced apart to form a primary flux air gap closely adjacent and parallel with an outer side wall of said flattened band, a core for the secondary winding having pole piece extensions to form a secondary flux air gap in the same plane with and crossing the primary flux air gap at right angles, and a magnetic disc rotor intercepting the primary and secondary fluxes in said air gap.

HENRY E. WARREN.